(12) United States Patent
Weverka et al.

(10) Patent No.: US 6,501,877 B1
(45) Date of Patent: Dec. 31, 2002

(54) WAVELENGTH ROUTER

(75) Inventors: Robert T. Weverka, San Mateo, CA (US); Steven P. Georgis, Boulder, CO (US); Richard S. Roth, Boulder, CO (US)

(73) Assignee: Network Photonics, Inc., Boulder, CO (US)

( * ) Notice: Subject to any disclaimer, the term of this patent is extended or adjusted under 35 U.S.C. 154(b) by 0 days.

(21) Appl. No.: 09/442,061

(22) Filed: Nov. 16, 1999

(51) Int. Cl.$^7$ ................................................ G02B 6/26
(52) U.S. Cl. ........................... 385/31; 385/33; 385/39; 385/37
(58) Field of Search ........................... 385/31, 15, 37, 385/33, 35, 39, 47

(56) References Cited

U.S. PATENT DOCUMENTS

| | | | |
|---|---|---|---|
| 4,507,790 A | 3/1985 | Nettleton et al. | 372/100 |
| 5,414,540 A | 5/1995 | Patel et al. | 359/94 |
| 5,481,631 A | 1/1996 | Cahill et al. | 385/18 |
| 5,748,811 A | 5/1998 | Amersfoort et al. | 385/15 |
| 5,903,687 A | 5/1999 | Young et al. | 385/17 |
| 5,917,625 A | 6/1999 | Ogusu et al. | 359/130 |
| 5,960,133 A | * 9/1999 | Tomlinson | 385/18 |
| 5,999,672 A | * 12/1999 | Hunter et al. | 385/37 |
| 6,069,719 A | 5/2000 | Mizrahi | 359/124 |
| 6,097,519 A | * 8/2000 | Ford et al. | 359/130 |
| 6,097,859 A | 8/2000 | Solgaard et al. | 385/17 |
| 6,108,471 A | * 8/2000 | Zhang et al. | 385/37 |
| 6,307,657 B1 | 10/2001 | Ford | |

OTHER PUBLICATIONS

"Low Voltage Piezoelectric Stacks," Transducer Elements, Catalog # 1998, pp. 30–45, Piezo systems, Inc. Cambridge, MA 02139.

Nishi, I. et al., "Broad–passband–width optical filter for multi/demultiplexer using a diffraction grating and a retroreflector prism," *Electronics Letters*, vol. 21(10), pp. 434–424 (May 9, 1985).

* cited by examiner

*Primary Examiner*—Hemang Sanghavi
*Assistant Examiner*—Sung Pak
(74) *Attorney, Agent, or Firm*—Townsend and Townsend and Crew LLP

(57) ABSTRACT

A wavelength router that selectively directs spectral bands between an input port and a set of output ports. The router includes a free-space optical train disposed between the input ports and said output ports, and a routing mechanism. The free-space optical train can include air-spaced elements or can be of generally monolithic construction. The optical train includes a dispersive element such as a diffraction grating, and is configured so that the light from the input port encounters the dispersive element twice before reaching any of the output ports. The routing mechanism includes one or more routing elements and cooperates with the other elements in the optical train to provide optical paths that couple desired subsets of the spectral bands to desired output ports. The routing elements are disposed to intercept the different spectral bands after they have been spatially separated by their first encounter with the dispersive element.

29 Claims, 9 Drawing Sheets

WAVELENGTH ROUTER

The following appendix is filed herewith as a part of the application and is incorporated by reference in its entirety for all purposes:

Presentation, titled "Wavelength Router, also referred to as Wavelength Routing Element™ or WRE," containing 28 pages (slides) on 7 sheets.

BACKGROUND OF THE INVENTION

This application relates generally to fiber-optic communications and more specifically to techniques and devices for routing different spectral bands of an optical beam to different output ports. (or conversely, routing different spectral bands at the output ports to the input port).

The Internet and data communications are causing an explosion in the global demand for bandwidth. Fiber optic telecommunications systems are currently deploying a relatively new technology called dense wavelength division multiplexing (DWDM) to expand the capacity of new and existing optical fiber systems to help satisfy this demand. In DWDM, multiple wavelengths of light simultaneously transport information through a single optical fiber. Each wavelength operates as an individual channel carrying a stream of data. The carrying capacity of a fiber is multiplied by the number of DWDM channels used. Today DWDM systems employing up to 80 channels are available from multiple manufacturers, with more promised in the future.

In all telecommunication networks, there is the need to connect individual channels (or circuits) to individual destination points, such as an end customer or to another network. Systems that perform these functions are called cross-connects. Additionally, there is the need to add or drop particular channels at an intermediate point. Systems that perform these functions are called add-drop multiplexers (ADMs). All of these networking functions are currently performed by electronics—typically an electronic SONET/SDH system. However SONET/SDH systems are designed to process only a single optical channel. Multi-wavelength systems would require multiple SONET/SDH systems operating in parallel to process the many optical channels. This makes it difficult and expensive to scale DWDM networks using SONET/SDH technology.

The alternative is an all-optical network. Optical networks designed to operate at the wavelength level are commonly called "wavelength routing networks" or "optical transport networks" (OTN). In a wavelength routing network, the individual wavelengths in a DWDM fiber must be manageable. New types of photonic network elements operating at the wavelength level are required to perform the cross-connect, ADM and other network switching functions. Two of the primary functions are optical add-drop multiplexers (OADM) and wavelength-selective cross-connects (WSXC).

In order to perform wavelength routing functions optically today, the light stream must first be de-multiplexed or filtered into its many individual wavelengths, each on an individual optical fiber. Then each individual wavelength must be directed toward its target fiber using a large array of optical switches commonly called as optical cross-connect (OXC). Finally, all of the wavelengths must be re-multiplexed before continuing on through the destination fiber. This compound process is complex, very expensive, decreases system reliability and complicates system management. The OXC in particular is a technical challenge. A typical 40–80 channel DWDM system will require thousands of switches to fully cross-connect all the wavelengths. Opto-mechanical switches, which offer acceptable optical specifications are too big, expensive and unreliable for widespread deployment. New integrated solid-state technologies based on new materials are being researched, but are still far from commercial application.

Consequently, the industry is aggressively searching for an all-optical wavelength routing solution which enables cost-effective and reliable implementation of high-wavelength-count systems.

SUMMARY OF THE INVENTION

The present invention provides a wavelength router that allows flexible and effective routing of spectral bands between an input port and a set of output ports (reversibly, also between the output ports and the input port).

An embodiment of the invention includes a free-space optical train disposed between the input ports and the output ports, and a routing mechanism. The free-space optical train can include air-spaced elements or can be of generally monolithic construction. The optical train includes a dispersive element such as a diffraction grating, and is configured so that the light from the input port encounters the dispersive element twice before reaching any of the output ports. The routing mechanism includes one or more routing elements and cooperates with the other elements in the optical train to provide optical paths that couple desired subsets of the spectral bands to desired output ports. The routing elements are disposed to intercept the different spectral bands after they have been spatially separated by their first encounter with the dispersive element.

The invention includes dynamic (switching) embodiments and static embodiments. In dynamic embodiments, the routing mechanism includes one or more routing elements whose state can be dynamically changed in the field to effect switching. In static embodiments, the routing elements are configured at the time of manufacture or under circumstances where the configuration is intended to remain unchanged during prolonged periods of normal operation.

In the most general case, any subset of the spectral bands, including the null set (none of the spectral bands) and the whole set of spectral bands, can be directed to any of the output ports. However, there is no requirement that the invention be able to provide every possible routing. Further, in general, there is no constraint on whether the number of spectral bands is greater or less than the number of output ports.

In some embodiments of the invention, the routing mechanism includes one or more retroreflectors, each disposed to intercept a respective one of the spectral bands after the first encounter with the dispersive element, and direct the light in the opposite direction with a controllable transverse offset. In other embodiments, the routing mechanism includes one or more tiltable mirrors, each of which can redirect one of the spectral bands with a controllable angular offset. There are a number of ways to implement the retroreflectors, including as movable rooftop prisms or as subassemblies including fixed and rotating mirrors.

In some embodiments, the beam is collimated before encountering the dispersive element, so as to result in each spectral band leaving the dispersive element as a collimated beam traveling at an angle that varies with the wavelength. The dispersed beams are then refocused onto respective routing elements and directed back so as to encounter the same elements in the optical train and the dispersive element before exiting the output ports as determined by the disposition of the respective routing elements. Some embodiments of the invention use cylindrical lenses while others use spherical lenses. In some embodiments, optical power and dispersion are combined in a single element, such as a computer generated holograph.

It is desirable to configure embodiments of the invention so that each routed channel has a spectral transfer function that is characterized by a band shape having a relatively flat top. This is achieved by configuring the dispersive element to have a resolution that is finer than the spectral acceptance range of the individual routing elements. In many cases of interest, the routing elements are sized and spaced to intercept bands that are spaced at regular intervals. The bands are narrower than the band intervals, and the dispersive element has a resolution that is significantly finer than the band intervals.

A further understanding of the nature and advantages of the present invention may be realized by reference to the remaining portions of the specification and the drawings.

DESCRIPTION OF SPECIFIC EMBODIMENTS

Introduction

Figure 1A:
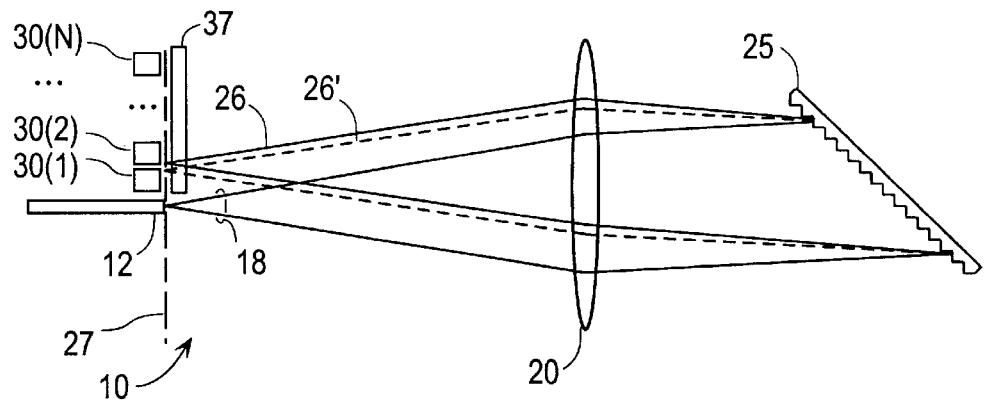
FIGS. 1A, 1B, and 1C are schematic top, side, and end views, respectively, of a wavelength router according to an embodiment of the invention that uses spherical focusing elements.

The following description sets forth embodiments of an all-optical wavelength router according to the invention. Embodiments of the invention can be applied to network elements such as optical add-drop multiplexers (OADMs) and wavelength-selective cross-connects (WSXCs) to achieve the goals of optical networking systems.

The general functionality of the wavelength router is to accept light having a plurality of (say N) spectral bands at an input port, and selectively direct subsets of th spectral bands to desired ones of a plurality of (say M) output ports. In a specific implementation, N=80 and M=2 (i.e., each of 80 wavelengths is selectively directed to either of two output ports). Most of the discussion will be with reference to dynamic (switching) embodiments where the routing mechanism includes one or more routing elements whose state can be dynamically changed in the field to effect switching. The invention also includes static embodiments in which the routing elements are configured at the time of manufacture or under circumstances where the configuration is intended to remain unchanged during prolonged periods of normal operation.

The embodiments of the invention include a dispersive element, such as a diffraction grating or a prism, which operates to deflect incoming light by a wavelength-dependent amount. Different portions of the deflected light are intercepted by different routing elements. Although the incoming light could have a continuous spectrum, adjacent segments of which could be considered different spectral bands, it is generally contemplated that the spectrum of the incoming light will have a plurality of spaced bands.

The terms "input port" and "output port" are intended to have broad meanings. At the broadest, a port is defined by a point where light enters or leaves the system. For example, the input (or output) port could be the location of a light source (or detector) or the location of the downstream end of an input fiber (or the upstream end of an output fiber). In specific embodiments, the structure at the port location could include a fiber connector to receive the fiber, or could include the end of a fiber pigtail, the other end of which is connected to outside components. Most of the embodiments contemplate that light will diverge as it enters the wavelength router after passing through the input port, and will be converging within the wavelength router as it approaches the output port. However, this is not necessary.

The International Telecommunications Union (ITU) has defined a standard wavelength grid having a frequency band centered at 193,100 GHz, and another band at every 100 GHz interval around 193,100 GHz. This corresponds to a wavelength spacing of approximately 0.8 nm around a center wavelength of approximately 1550 nm, it being understood that the grid is uniform in frequency and only approximately uniform in wavelength. Embodiments of the invention are preferably designed for the ITU grid, but finer frequency intervals of 25 GHz and 50 GHz (corresponding to wavelength spacings of approximately 0.2 nm and 0.4 nm) are also of interest.

The ITU has also defined standard data modulation rates. OC-48 corresponds to approximately 2.5 GHz (actually 2.488 GHz), OC-192 to approximately 10 GHz, and OC-768 to approximately 40 GHz. The unmodulated laser bandwidths are on the order of 10–15 GHz. In current practice, data rates are sufficiently low (say OC-192 on 100 GHz channel spacing) that the bandwidth of the modulated signal is typically well below the band interval. Thus, only a portion of the capacity of the channel is used. However, when attempts are made to use more of the available bandwidth (say OC-768 on 100 GHz channel spacing), problems relating to the band shape of the channel itself arise. Techniques for addressing these problems will be described below.

Embodiments with Spherical Focusing Elements

Figure 1B:
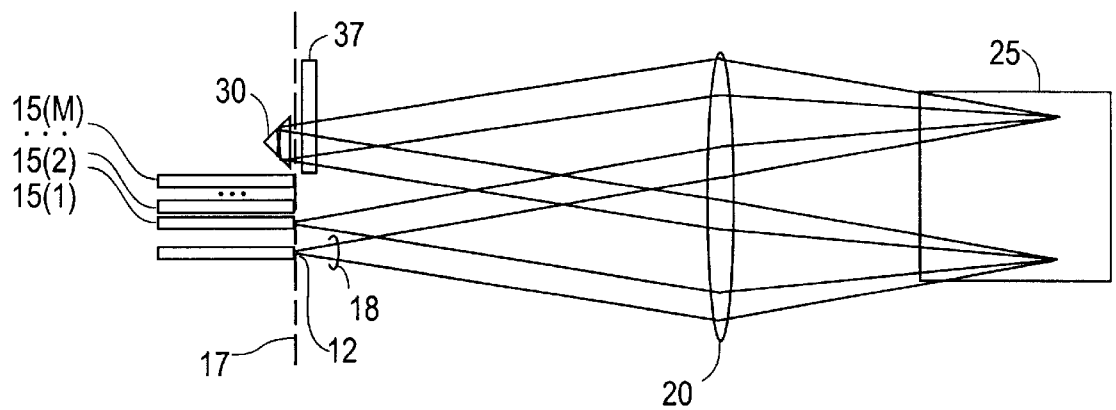
Figure 1C:
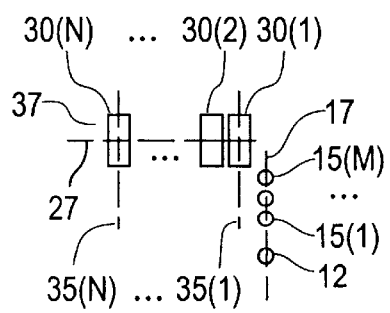

FIGS. 1A, 1B, and 1C are schematic top, side, and end views, respectively, of a wavelength router 10 according to an embodiment of the invention. The general functionality of wavelength router 10 is to accept light having a plurality of (say N) spectral bands at an input port 12, and selectively direct subsets of the spectral bands to desired ones of a plurality of (say M) output ports, designated 15(1 . . . M). The output ports are shown in the end view of FIG. 1C as disposed along a line 17 that extends generally perpendicular to the top view of FIG. 1A. The input and output ports are shown as communicating with respective input and output optical fibers, but it should be understood that the input port could also receive light directly from a light source, and the output ports could be coupled directly to optical detectors. The drawing is not to scale.

Light entering wavelength router 10 from input port 12 forms a diverging beam 18, which includes the different spectral bands. Beam 18 encounters a lens 20 which collimates the light and directs it to a reflective diffraction grating 25. Grating 25 disperses the light so that collimated beams at different wavelengths are directed at different angles back towards lens 20. Two such beams are shown explicitly and denoted 26 and 26' (the latter drawn in dashed lines). Since these collimated beams encounter the lens at different angles, they are focused at different points along a line 27 in a transverse focal plane. Line 27 extends in the plane of the top view of FIG. 1A.

The focused beams encounter respective ones of plurality of retroreflectors, designated 30(1 . . . N), located near the focal plane. The beams are directed, as diverging beams, back to lens 20. As will be described in detail below, each retroreflector sends its intercepted beam along a reverse path that may be displaced in a direction perpendicular to line 27. More specifically, the beams are displaced along respective lines 35(1 . . . N) that extend generally parallel to line 17 in the plane of the side view of FIG. 1B and the end view of FIG. 1C.

In the particular embodiment shown, the displacement of each beam is effected by moving the position of the retroreflector along its respective line 35(i). In other embodiments, to be described below, the beam displacement is effected by a reconfiguration of the retroreflector. It is noted that the retroreflectors are shown above the output ports in the plane of FIG. 1C, but this is not necessary; other relative positions may occur for different orientations of the grating or other elements.

The beams returning from the retroreflectors are collimated by lens 20 and directed once more to grating 25. Grating 25, on the second encounter, removes the angular separation between the different beams, and directs the collimated beams back to lens 20, which focuses the beams. However, due to the possible displacement of each beam by its respective retroreflector, the beams will be focused at possibly different points along line 17. Thus, depending on the positions of the retroreflectors, each beam is directed to one or another of output ports 15(1 . . . M).

In sum, each spectral band is collimated, encounters the grating and leaves the grating at a wavelength-dependent angle, is focused on its respective retroreflector such that is displaced by a desired amount determined by the retroreflector, is collimated again, encounters the grating again so that the grating undoes the previous dispersion, and is focused on the output port that corresponds to the displacement imposed by the retroreflector. In the embodiment described above, the light traverses the region between the ports and the grating four times, twice in each direction.

This embodiment is an airspace implementation of a more generic class of what are referred to as free-space embodiments. In some of the other free space embodiments, to be described below, the various beams are all within a body of glass. The term "free-space" refers to the fact that the light within the body is not confined in the dimensions transverse to propagation, but rather can be regarded as diffracting in these transverse dimensions. Since the second encounter with the dispersive element effectively undoes the dispersion induced by the first encounter, each spectral band exits the router with substantially no dispersion.

Figure 2A:
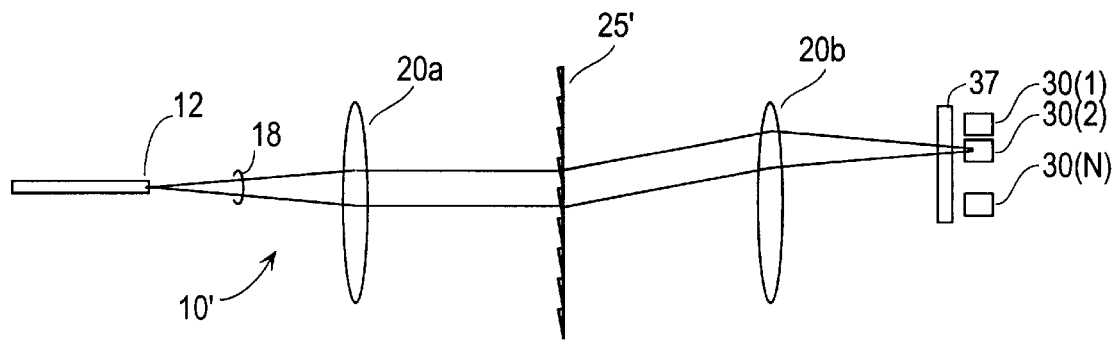
FIGS. 2A and 2B are schematic top and side views, respectively, of a wavelength router according to another embodiment of the invention that uses spherical focusing elements.
Figure 2B:
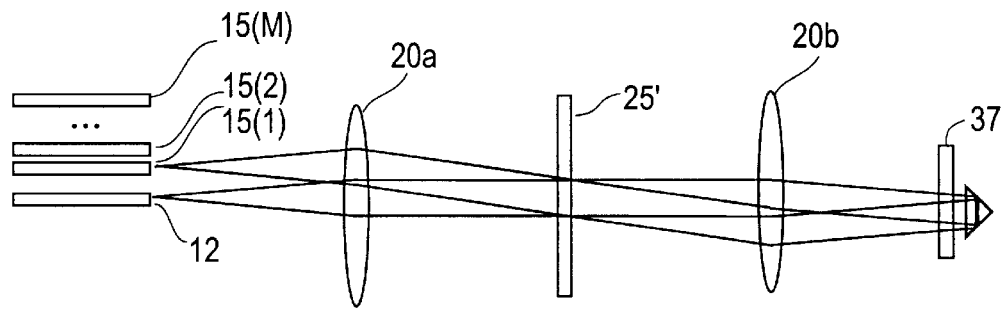

FIGS. 2A and 2B are schematic top and side views, respectively, of a wavelength router, designated 10', according to an embodiment of the invention. The same reference numerals or primed or suffixed reference numerals will be used for elements corresponding to those in FIGS. 1A–1C. This embodiment differs from the embodiment of FIGS. 1A–1C in that it uses a transmissive diffraction grating 25' and a pair of lenses 20a and 20b. Thus, this embodiment can be considered an unfolded version of the embodiment of FIGS. 1A–1C.

Light entering wavelength router 10' from input port 12 forms diverging beam 18, which includes the different spectral bands. Beam 18 encounters first lens 20a, which collimates the light and directs it to grating 25'. Grating 25' disperses the light so that collimated beams at different wavelengths emerge from the beam and proceed. The collimated beams, one of which is shown, encounter second lens 20b, which focuses the beams. The focused beams encounter respective ones of plurality of retroreflectors 30(1 . . . N), located near the focal plane. The beams are reflected, and emerge as diverging beams, back to lens 20b, are collimated and directed to grating 25'. Grating 25', on the second encounter, removes the angular separation between the different beams, which are then focused in the plane of output ports 15(1 . . . M).

In the specific implementation, input port 12, lens 20a, grating 25', lens 20b, and the retroreflectors are spaced at approximately equal intervals, with the two lenses having equal focal lengths and the distance between the input port and the retroreflectors being four times (4×) the focal length. Thus the focal lengths and the relative positions define what is referred to as a "4f relay" between input port 12 and the retroreflectors, and also a 4f relay between the retroreflectors and the output ports. This configuration is not necessary, but is preferred. The optical system is preferably telecentric.

Figure 3:
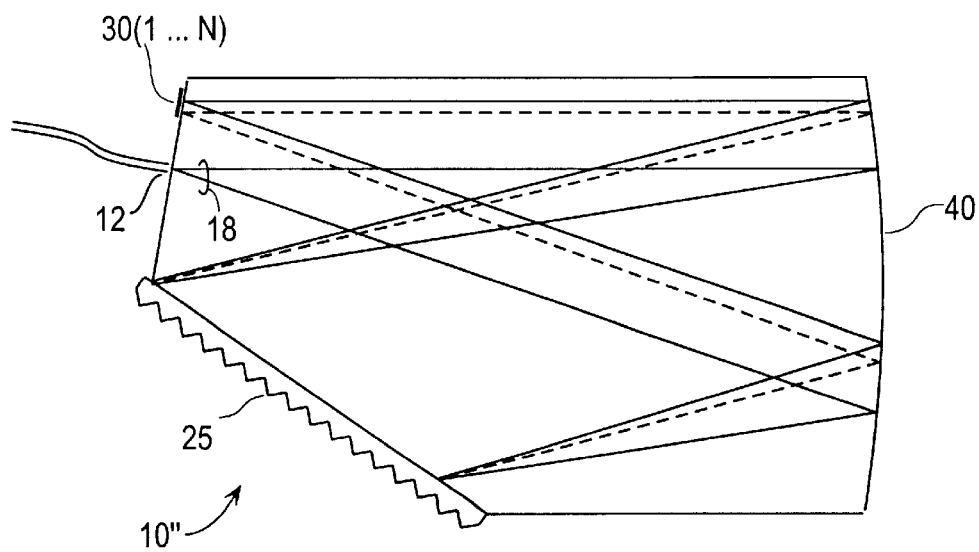
FIG. 3 is a schematic top view of a wavelength router according to another embodiment of the invention that uses spherical focusing elements.

FIG. 3 is a schematic top view of a wavelength router 10" according to an embodiment of the invention. This embodiment is a solid glass embodiment that uses a concave reflector 40 in the place of lens 20 of the first embodiment (or lenses 20*a* and 20*b* in the second embodiment). Thus, this embodiment can be considered a further folded version of the embodiment of FIGS. 1A–1C. As above, light entering wavelength router 10" from input port 12 forms diverging beam 18, which includes the different spectral bands. Beam 18 encounters concave reflector 40, which collimates the light and directs it to reflective diffraction grating 25. Grating 25 disperses the light so that collimated beams at different wavelengths are directed at different angles back toward reflector 40. Two such beams are shown explicitly, one in solid lines and one in dashed lines. Since these collimated beams encounter the reflector at different angles, they are focused at different points in a transverse focal plane.

The focused beams encounter retroreflectors 30(1 . . . N) located near the focal plane. The operation in the reverse direction is as described in connection with the embodiments above, and the beams follow the reverse path, which is displaced in a direction perpendicular to the plane of FIG. 3. Therefore, the return paths directly underlie the forward paths and are therefore not visible in FIG. 3. On this return path, the beams encounter concave reflector 40, reflective grating 25', and concave reflector 40, the final encounter with which focuses the beams to the desired output ports (not shown in this figure) since they underlie input port 12.

Rooftop-Prism-Based Retroreflector Implementations

Figure 4A:
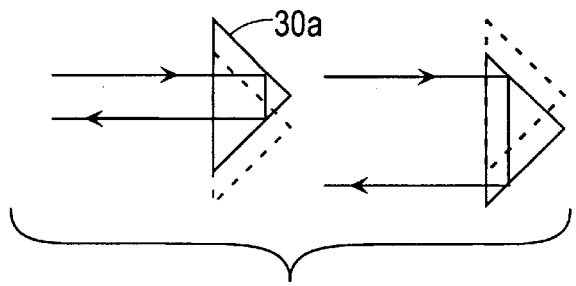
FIGS. 4A and 4B show alternative implementations of a retroreflector, based on a movable rooftop prism, suitable for use with embodiments of the present invention.
Figure 4B:
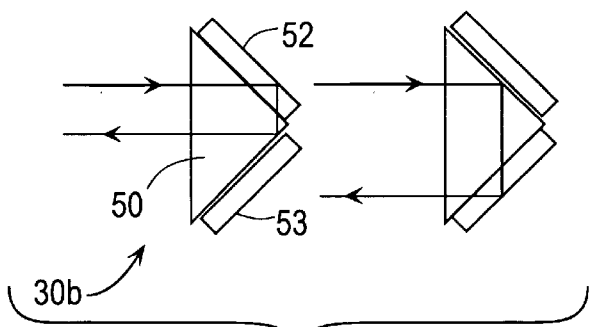

FIGS. 4A and 4B show alternative implementations of a retroreflector, based on a movable rooftop prism, suitable for use with embodiments of the present invention. The retroreflectors, designated 30*a* and 30*b*, could be used to implement array 30(1 . . . N) in the embodiments described above.

FIG. 4A shows schematically the operation of a retroreflector, designated 30*a*, that operates to displace an incoming beam by different amounts depending on displacement of the retroreflector transversely relative to the beam. The left portion of the figure shows the retroreflector in a first position. A second, downwardly displaced, position is shown in phantom. The right portion of the figure shows the retroreflector displaced to the second position, whereupon the reflected beam is displaced downwardly by an amount proportional to the retroreflector displacement. The retroreflector is shown as a rooftop prism, and the operation is based on total internal reflection. It is also possible to implement the retroreflector as a pair of mirrors in a V-shaped configuration. A retroreflector of this type has the property that while the reflected beam is offset from the incident beam by an amount that depends on the incident beam's offset relative to the prism's peak, the total path length is independent of the offset.

FIG. 4B shows schematically the operation of a retroreflector, designated 30*b*, that includes a rooftop prism element 50 and a pair of matched-index upper and lower plates 51 and 52 in a V-shaped configuration spaced slightly from the prism element. Displacement of the incoming beam is effected by selectively contacting prism element 50 with one or the other of plates 51 or 52. The left portion of the figure shows the prism element contacting upper plate 51, whereupon the input beam passes into the upper plate and is internally reflected by the upper plate and the lower surface of the prism element. The right portion of the figure shows the prism element contacting lower plate 52, whereupon the input beam is internally reflected by the upper surface of the prism element, passes into the lower plate, and undergoes internal reflection at the lower surface of the lower plate. This retroreflector can be seen to provide a beam displacement that can be large relative to the prism element displacement.

Figure 4C:
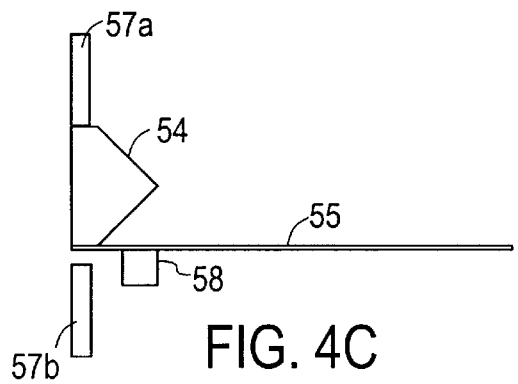
FIGS. 4C and 4D are side and top views of a rooftop prism array fabricated as a single unit.
Figure 4D:
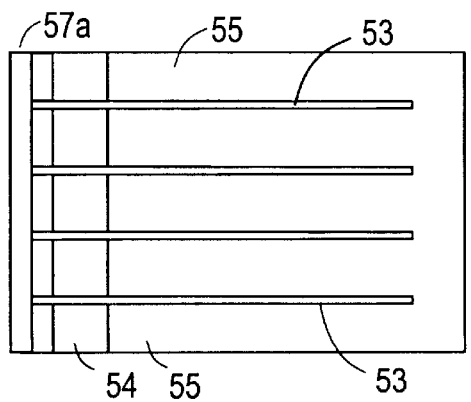

FIGS. 4C and 4D are side and top views of a rooftop prism array fabricated as a single unit. To maintain uniformity across the array, the rooftop prism array is first made as a single elongated prism element and attached to one end of a support plate. The top and bottom of this assembly is polished optically flat and slots 53 are cut through the prism and support plate assembly to define an array of individual prism elements 54 on respective support tines 55. Two stops 57*a* and 57*b* are placed, one above and one below this rooftop prism array. These stops are also polished optically flat. Respective actuators 58 move each prism element against either the top or bottom stop. Any of the prisms held against a given stop are aligned to each other with very high tolerance due to the optical precision in polishing the elongated prism element flat before cutting the slots.

Associated with each retroreflector is an actuator. This is not shown explicitly in FIG. 4A or 4B, but FIG. 4C shows actuator 58 explicitly. The particular type of actuator is not part of the invention, and many types of actuator mechanisms will be apparent to those skilled in the art. While FIG. 4C shows the actuator explicitly as a separate element (e.g., a piezoelectric transducer), the support plate can be made of a bimorph bender material and thus also function as the actuator. A piezoceramic bender, which is available from Piezo Systems, Inc., 186 Massachusetts Avenue, Cambridge, Mass. 02139, is a sandwich structure that bends when subjected to a voltage between electrodes on the two outer surfaces.

Movable-Mirror-Based Retroreflector Implementations

Figure 5A:
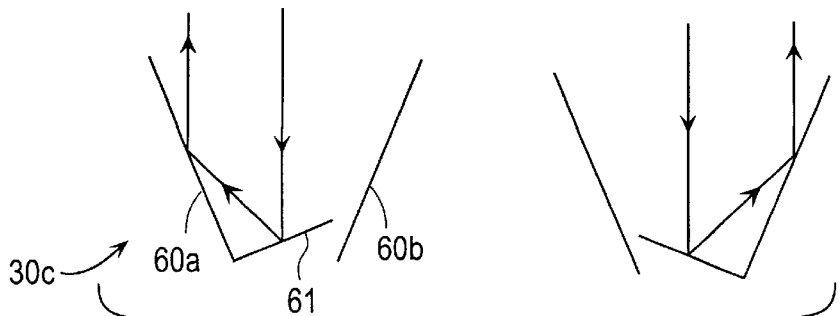
FIG. 5A shows an implementation of a retroreflector, based on a movable mirror, suitable for use with embodiments of the present invention.

FIG. 5A shows schematically the operation of a retroreflector, designated 30*c*, that includes a pair of fixed mirrors 60*a* and 60*b* inclined with respect to one another (V-shaped, or open configuration as shown) and a rotatable mirror 61. The left portion of the figure shows the rotatable mirror positioned to direct the incoming beam to mirror 60*a*, while the right portion shows the rotatable mirror positioned to direct the incoming beam to mirror 60*b*. In each of the two orientations, the fixed mirror and the rotatable mirror define an included angle of 90° so as to provide a retroreflecting operation.

Figure 5B:
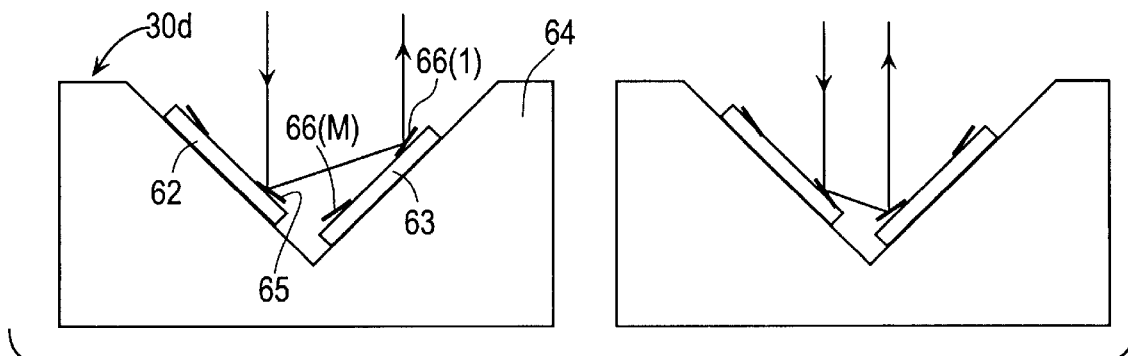
FIGS. 5B and 5C are side and top views of an implementation of a retroreflector array, based on micromirrors, suitable for use with embodiments of the present invention.
Figure 5C:
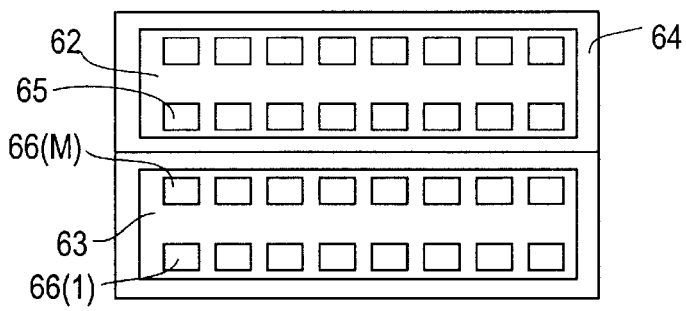

FIG. 5B shows schematically the operation of a retroreflector, designated 30*d*, that uses micromirrors. FIG. 5C is a top view. A pair of micromirror arrays 62 and 63 are mounted to the sloped faces of a V-block 64. A single micromirror 65 in micromirror array 62 and a row of micromirrors 66(1 . . . M) in micromirror array 63 define a single retroreflector. Micrometer arrays may conveniently be referred to as the input and output micromirror arrays, with the understanding the light paths are reversible. The left portion of the figure shows micromirror 65 in a first orientation so as to direct the incoming beam to micromirror 66(1), which is oriented 90° with respect to micromirror 65's first orientation to direct the beam back in a direction opposite to the incident direction. The right half of the figure shows micromirror 65 in a second orientation so as to direct the incident beam to micromirror 66(M). Thus, micromirror 65 is moved to select the output position of the beam, while micromirrors 66(1 . . . M) are fixed during normal operation. Micromirror 65 and the row of micromirrors 66 (1 . . . M) can be replicated and displaced in a direction perpendicular to the plane of the figure. While micromirror array 62 need only be one-dimensional, it may be convenient to provide additional micromirrors to provide additional flexibility.

It is preferred that the micromirror arrays are planar and that the V-groove have a dihedral angle of approximately 90° so that the two micromirror arrays face each other at 90°. This angle may be varied for a variety of purposes by a considerable amount, but an angle of 90° facilitates routing the incident beam with relatively small angular displacements of the micromirrors. For example, commercially available micromirror arrays (e.g., Texas Instruments) are capable of deflecting on the order of ±10°. The micromirror arrays may be made by known techniques within the field of micro-electro-mechanical systems (MEMS). In this implementation, the mirrors are formed as structures micromachined on the surface of a silicon chip. These mirrors are attached to pivot structures also micromachined on the surface of the chip. In some implementations, the micromirrors are selectably tilted about an suitably oriented axis using electrostatic attraction.

Figure 5D:
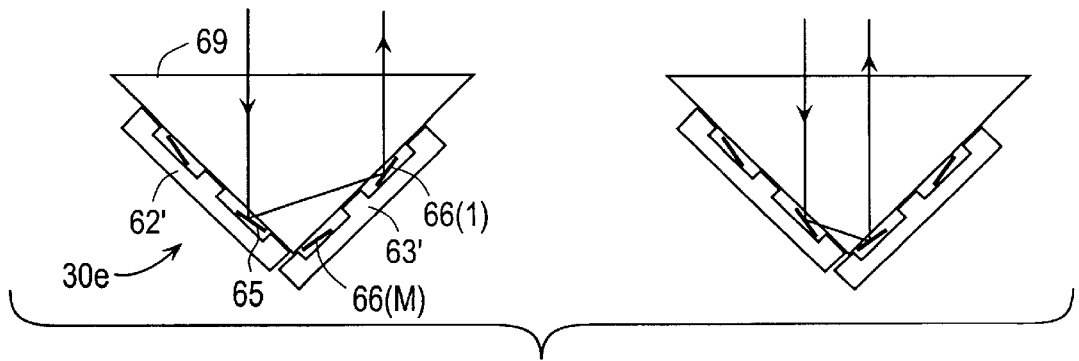
FIG. 5D is a side view of an alternative implementation of a retroreflector array based on micromirrors.

FIG. 5D shows schematically the operation of a retroreflector, designated 30e, that differs from the implementation shown in FIG. 5C in the use of a prism 69 rather than V-block 64. Corresponding reference numerals are used for like elements. As in the case of the V-groove, it is desired that the micromirror arrays, designated 62' and 63', face each other with an included angle of 90°. To this end, the prism preferably has faces with included angles of 90°, 45°, and 45°, and the micromirror arrays are mounted with the micromirrors facing the prism surfaces that define the right angle.

The micromirror arrays are preferably hermetically sealed from the external environment. This hermetic sealing may be accomplished by enclosing each micromirror array in a sealed cavity formed between the surface of the micromirror array on its silicon chip and the surface of the prism. These silicon chips incorporating the micromirror arrays may be bonded around their periphery to the surface of the prism, with an adequate spacing between the mirrors and the surface of the prism. This sealed cavity may be formed to an appropriate dimension by providing a ridge around the periphery of the silicon chip. Alternatively, the function of this ridge may be performed by some other suitable peripheral sealing spacer bonded to both the periphery of the silicon chip and to the surface of the prism. If desired, each micromirror can be in its own cavity in the chip. The surfaces of the prism preferably have an anti-reflection coating.

The retroreflector implementations that comprise two arrays of tiltable micromirrors are currently preferred. Each micromirror in the input micromirror array receives light after the light's first encounter with the dispersive element, and directs the light to a mirror in the output micromirror array. By changing the angle of the mirror in the input array, the retroreflected light has a transverse displacement that causes it to encounter the dispersive element and exit the selected output port. As mentioned above, embodiments of the invention are reversible. The implementation with the V-block is generally preferred for embodiments where most of the optical path is in air, while the implementation with the prism is generally preferred for embodiments where most of the optical path is in glass. As an alternative to providing a separate prism or V-block, the input array mounting face and the output array mounting face may be formed as integral features of the router's optical housing.

The input micromirror array preferably has at least as many rows of micromirrors as there are input ports (if there are more than one), and as many columns of mirrors as there are wavelengths that are to be selectably directed toward the output micromirror array. Similarly, The output micromirror array preferably has at least as many rows of micromirrors as there are output ports, and as many columns of mirrors as there are wavelengths that are to be selectably directed to the output ports.

In a system with a magnification factor of one-to-one, the rows of micromirrors in the input array are parallel to each other and the component of the spacing from each other along an axis transverse to the incident beam corresponds to the spacing of the input ports. Similarly, the rows of micromirrors in the output array are parallel to each other and spaced from each other (transversely) by a spacing corresponding to that between the output ports. In a system with a different magnification, the spacing between the rows of mirrors would be adjusted accordingly.

Embodiments with Cylindrical Focusing Elements

Figure 6A:
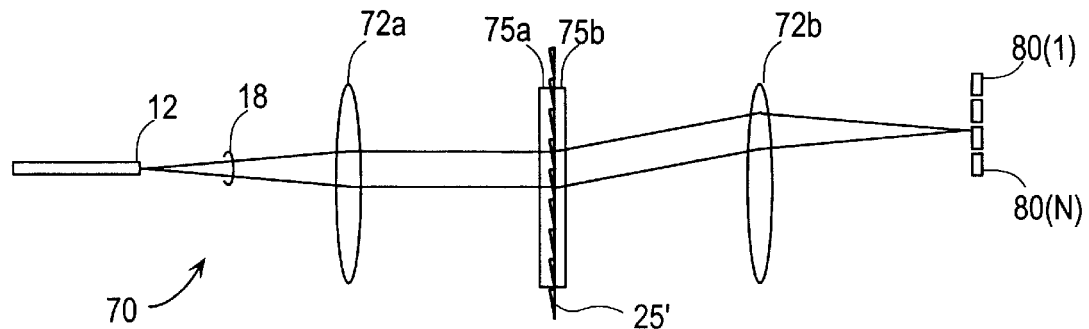
FIGS. 6A and 6B are schematic top and side views, respectively, of a wavelength router according to an embodiment of the invention that uses cylindrical focusing elements.
Figure 6B:
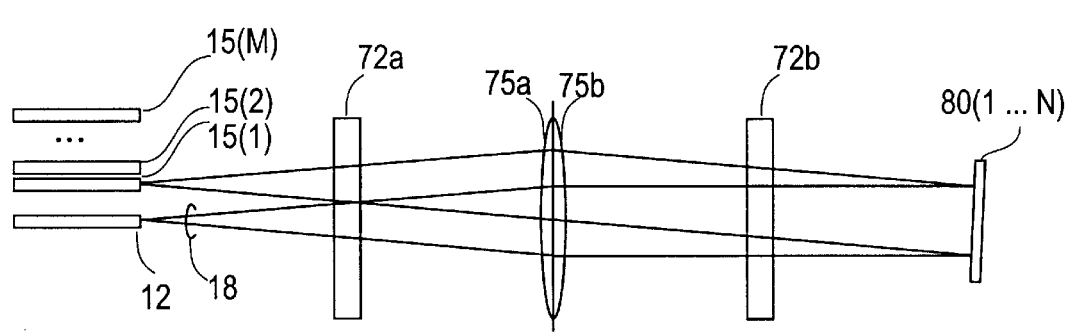

FIGS. 6A and 6B are schematic top and side views, respectively, of a wavelength router 70 according to an embodiment of the invention. This embodiment is an unfolded embodiment, and thus could be considered to correspond to the embodiment of FIGS. 2A and 2B. This embodiment includes transmissive diffraction grating 25', as in the embodiment of FIGS. 2A and 2B, but differs from that embodiment in that wavelength router 70 uses cylindrical lenses rather than spherical lenses, and tiltable mirrors rather than retroreflectors. The general functionality of wavelength router 70 is the same as the other embodiment, namely to accept light having a plurality of spectral bands at input port 12, and selectively direct subsets of the spectral bands to desired ones of a plurality of output ports 15(1 ... M).

The cylindrical lenses include a pair of lenses 72a and 72b, each having refractive power only in the plane of the top view (FIG. 6A), and a pair of lenses 75a and 75b each having refractive power only in the plane of the side view (FIG. 6B). As such, lenses 72a and 72b are drawn as rectangles in the plane of FIG. 6B, and lenses 75a and 75b are drawn as rectangles in the plane of FIG. 6A.

Light entering wavelength router 70 from input port 12 forms diverging beam 18, which includes the different spectral bands. Beam 18 encounters lens 72a, which collimates the light in one transverse dimension, but not the other, so that the beam has a transverse cross section that changes from circular to elliptical (i.e., the beam continues to expand in the plane of FIG. 6B, but not in the plane of FIG. 6A. The beam encounters lens 75a, grating 25', and lens 75b. Lenses 75a and 75b, together, collimate the light that is diverging in the plane of FIG. 6B so that the beam propagates with a constant elliptical cross section. Grating 25' disperses the light in the plane of FIG. 6A so that beams at different wavelengths are transmitted at different angles in the plane of FIG. 6A, but not in the plane of FIG. 6B.

The collimated beams encounter lens 72b, and are focused to respective lines. The focused beams encounter respective ones of plurality of tiltable mirrors 80(1 ... N), located near the focal plane. The beams are directed, diverging only in the plane of FIG. 6A, to lens 72b. Depending on the tilt angles of the respective mirrors, the beams are angularly displaced in the plane of FIG. 6B. The return beams undergo different transformations in the planes of FIGS. 6A and 6B, as will now be described.

In the plane of FIG. 6A, the beams are collimated by lens 72b, and directed once more to grating 25' (in this plane, lenses 75b and 75a do not change the collimated character of the beams). Grating 25', on this second encounter, removes the angular separation between the different beams, and directs the collimated beams back to lens 72a, which focuses the beams (only in the plane of FIG. 6A) at output ports 15(1 ... M). In FIG. 6A, the return beams are not shown separately, but rather have projections in the plane that coincide with the projection of the forward beam.

In the plane of FIG. 6B, the beams are focused by lenses 75a and 75b or to the output ports. However, due to the possible angular displacement of each beam by its respective mirror, the beams will be directed to one or another of output ports 15(1 ... M). In FIG. 6B, grating 25' and lenses 72b and 72a do not affect the direction of the beams, or whether the beams are diverging, collimated, or converging. The lenses 75a and 75b provide a Fourier relation in the plane of the side view, between mirrors 80(1 ... N) and output ports 15(1 ... M). This Fourier relation maps tilted wavefronts at the mirrors to displaced positions at the output ports.

In the specific implementation, input port 12, lens 72a, lens pair 75a/75b, lens 72b, and the tiltable mirrors are spaced at approximately equal intervals, with the focal length of the lens defined by lens pair 75a/75b being twice that of lenses 72a and 72b. This is not necessary, but is preferred. With these focal lengths and relative positions, lenses 72a and 72b define a 4f relay between input port 12 and the tiltable mirrors. Furthermore lens pair 75a/75b (treated as one lens), but encountered twice, defines a 4f relay between the input port and the output ports. The optical system is preferably telecentric.

Figure 7A:
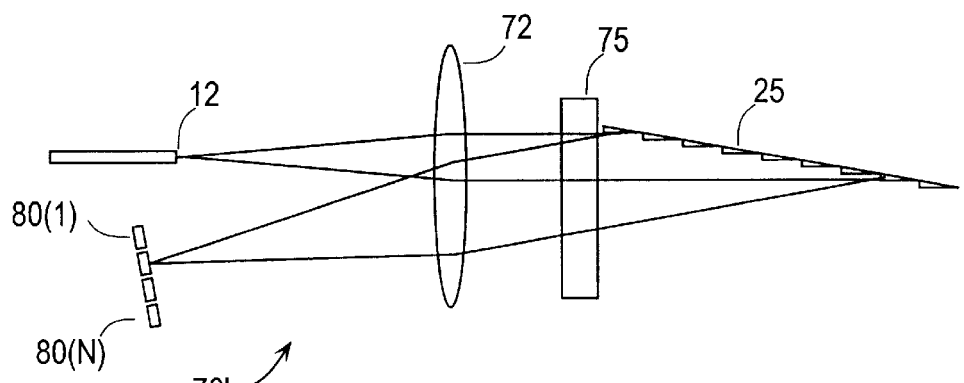
FIGS. 7A and 7B are schematic top and side views, respectively, of a wavelength router according to another embodiment of the invention that uses cylindrical focusing elements.
Figure 7B:
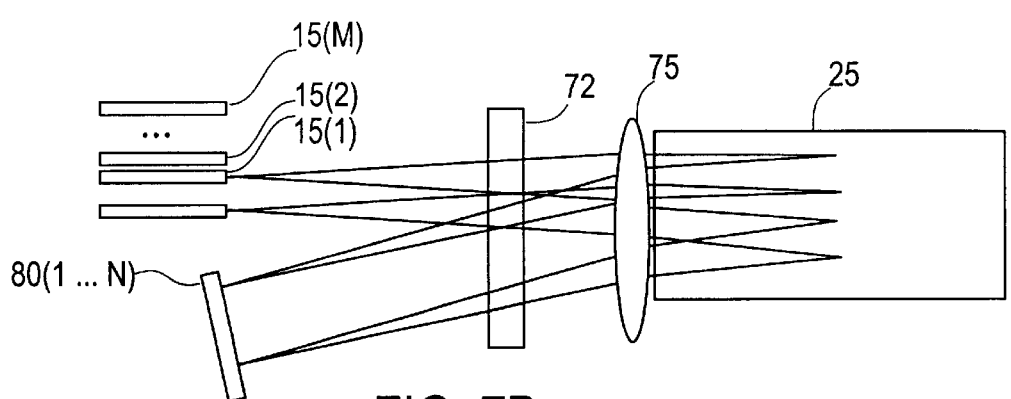

FIGS. 7A and 7B are schematic top and side views, respectively, of a wavelength router 70' according to an embodiment of the invention. This embodiment is a folded version of the embodiment of FIGS. 6A and 6B, and relates to that embodiment in a similar way to the way that the embodiment of FIGS. 1A–1C is a folded version of the embodiment of FIGS. 2A and 2B. Like the embodiment of FIGS. 1A–1C, wavelength router 70' uses a reflective diffraction grating 25. In view of its folded nature, this embodiment uses single cylindrical lenses 72 and 75 corresponding to lens pairs 72a/72b and 75a/75b in the embodiment of FIGS. 6A and 6B.

The operation is substantially the same as in the embodiment of FIGS. 6A and 6B except for the folding of the optical path. In this embodiment, the light encounters each lens four times, twice between the input port and the tiltable mirrors, and twice on the way from the tiltable mirrors to the output ports. It should be noted that diverging light encountering lens 75 is made less divergent after the first encounter and parallel (collimated) after the second encounter.

Embodiments with Combined Focusing/Dispersion Element

Figure 8A:
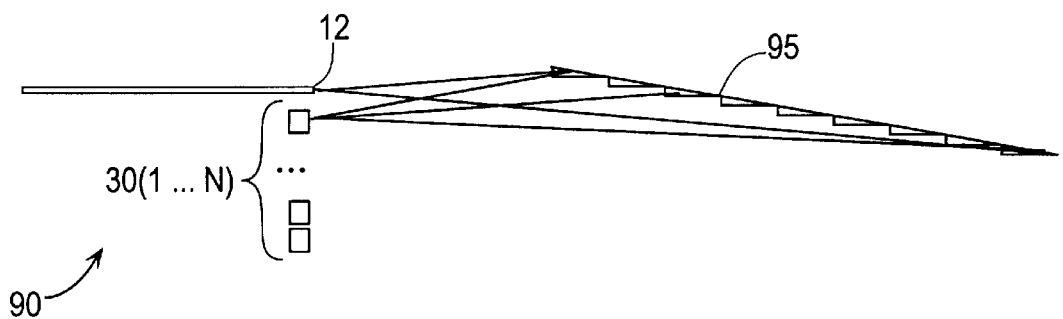
FIGS. 8A and 8B are schematic top and side end views, respectively, of a wavelength router according to an embodiment of the invention that combines spherical focusing power and dispersion in a single element.
Figure 8B:
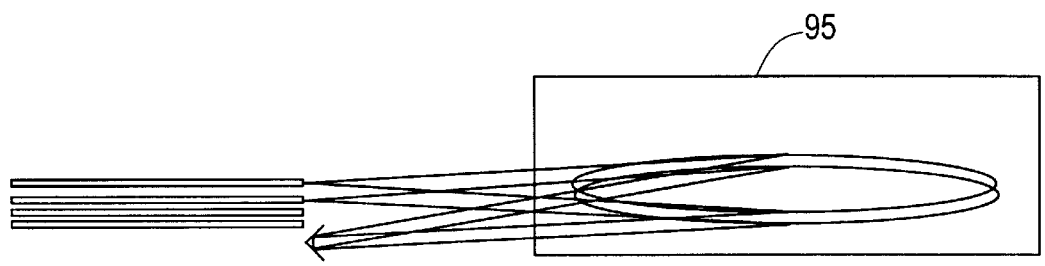

FIGS. 8A and 8B are schematic top and side views, respectively, of a wavelength router 90 according to an embodiment of the invention. This corresponds generally to the wavelength router shown in FIGS. 1A and 1B, except that the spherical focal power is incorporated in the grating itself. Thus optical power and dispersion are combined in a single element 95. This can be accomplished by ruling the grating on a curved surface, or by ruling curved grating lines on a flat surface. One popular alternative to the ruling engine for providing these grating lines is a holographic method in which photoresist is spun onto the grating substrate and exposed with the interference pattern from two diverging beams of light emanating from the intended source and focal points of the grating. The exposure light is at the midband wavelength or at an integer multiple of the midband wavelength. The exposed photoresist may be developed and used as is, or used as a barrier in an etching process.

Figure 9A:
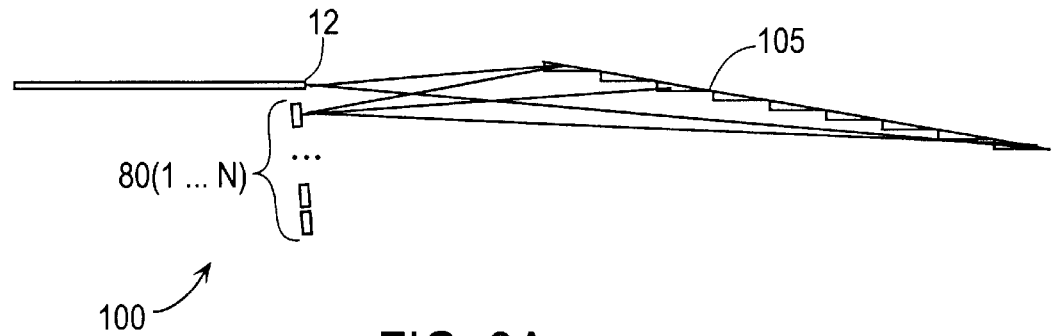
FIGS. 9A and 9B are schematic top and side views, respectively, of a wavelength router according to an embodiment of the invention that combines cylindrical focusing power and dispersion in a single element.
Figure 9B:
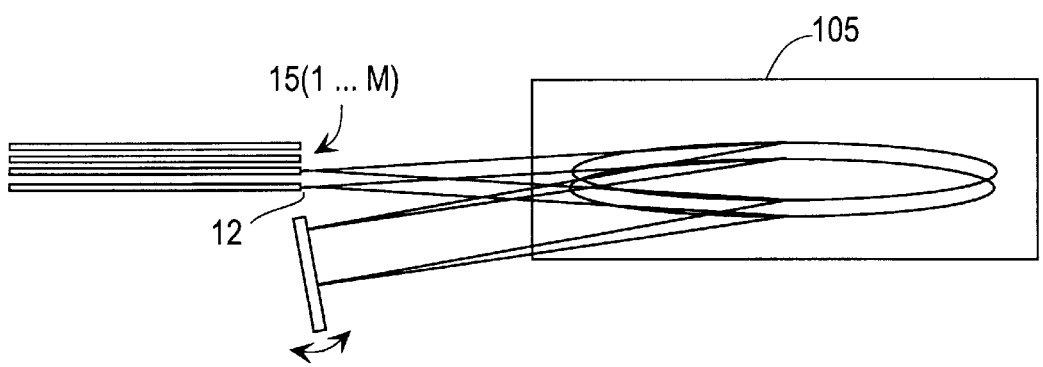

FIGS. 9A and 9B are schematic top and side views, respectively, of a wavelength router 100 according to an embodiment of the invention. This corresponds generally to the wavelength router shown in FIGS. 7A and 7B, which use cylindrical lenses and tilting mirrors, except that the cylindrical focal power is incorporated in the grating ruling in a single element 105. The focal power in the dimension of the top view of FIG. 9A is twice that in the top view of FIG. 9B. The holographic version of this grating may be constructed by exposing photoresist with the interference pattern from one diverging beam and one line source of light emanating from the intended source and focal line of the grating.

Band Shape and Resolution Issues

The physical positions in the plane of the retroreflector array correspond to frequencies with a scale factor determined by the grating dispersion and the lens focal length. The grating equation is $Nm\lambda = \sin\alpha \pm \sin\beta$ where N is the grating groove frequency m, is the diffraction order, $\lambda$ is the optical wavelength, $\beta$ is the incident optical angle, and $\alpha$ the diffraction angle. The lens maps the diffraction angle to position, x, at its back focal length, f, according to the equation $x = f \sin\alpha$. With the mirrors in the back focal plane of the lens, we have a linear relation between position in the mirror plane and the wavelength, $\lambda Nm = x/f \pm \sin\beta$. For a small change in wavelength a change in frequency is proportional to a change in wavelength. This gives us a scale factor between position and frequency of $\Delta x/\Delta v = fNm\lambda^2/c$. The position scale in the mirror plane is thus a frequency scale with this proportionality constant.

Figure 10A:
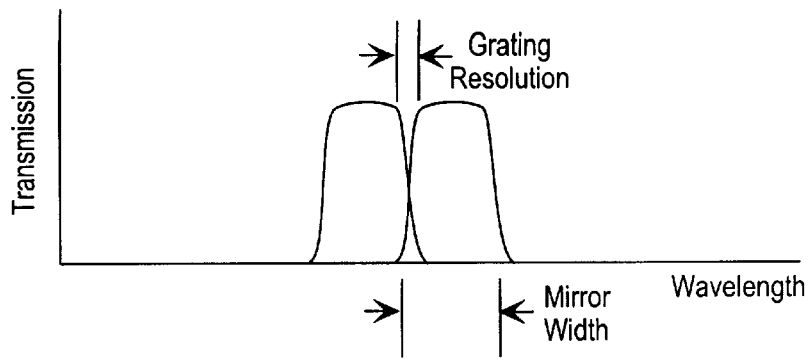
FIGS. 10A shows a preferred band shape.

FIG. 10A shows a preferred substantially trapezoidal band shape. In short, this is achieved by making the resolution of the grating finer than the size of the mirrors sampling the frequency domain. For an extremely large ratio of the grating spot size to the mirror size, the band pass response for each channel would merely be the rectangular response given by the mirror position in the perfectly resolved frequency plane of the grating. For finite grating resolution, the band pass response is a convolution of the spot determined by the diffraction from the grating with the rectangular sampling of the mirror. The result of such a convolution is depicted in FIG. 10A for a grating with a Gaussian like spot with finer resolution in the mirror plane than the mirror size. It is preferred for embodiments of the invention to provide a large ratio of mirror width to grating resolution because the resultant trapezoidal band shapes have a large usable flat top region as compared to the size of the unusable portion between bands, and this makes the utilization of the spectrum more efficient.

Figure 10B:
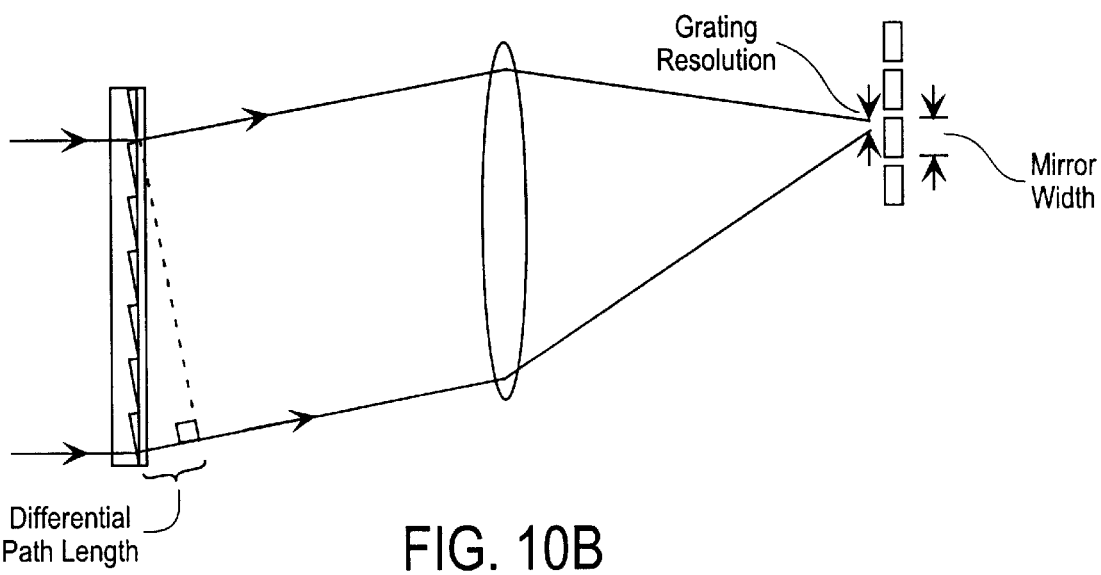
FIGS. 10B and 10C show the differential path length for a representative pat from FIG. 1A.

FIG. 10B also shows a differential path length in the optical beam at the angle of diffraction from the grating. This differential path length determines the frequency resolution of the grating. Within an order unity coefficient, determined by the transverse shape of the optical beam, the frequency resolution is the speed of light divided by this differential path length. Specific embodiments have optical bands separated by the ITU spacing of 100 GHz or finer. Consequently, it is preferred that the grating resolution be 10 GHz or finer to allow for a large flat band shape between channels, which will permit low-loss transmission of OC-768 data on 100 GHz channel spacings, or OC-192 data on 25 GHz spacings. This 10 GHz or finer grating resolution requires a differential path length of 3 cm or longer. In the folded geometry of FIG. 1A, this 3 cm is the round trip differential path length, or a one way differential of 1.5 cm.

Figure 10C:
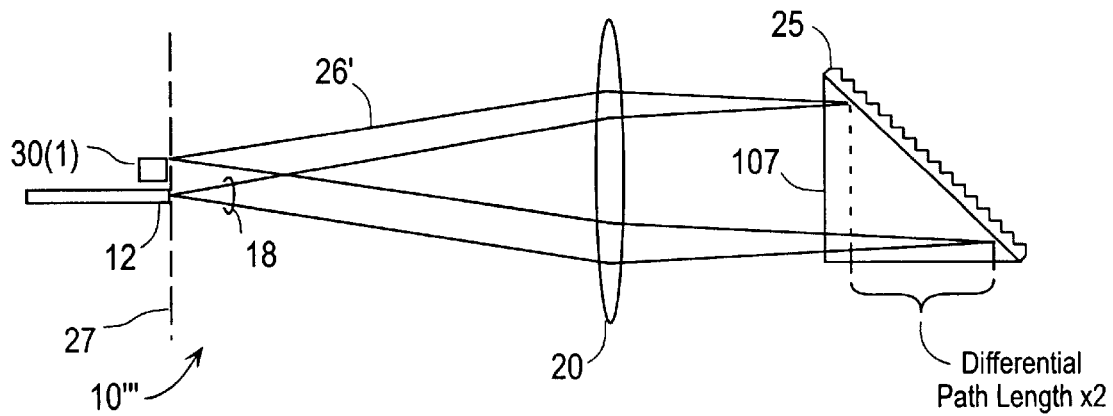

FIG. 10C shows a router 10''' where the differential path length is in a glass wedge 107. This embodiment corresponds to that of FIG. 1A. It is highly preferred that the center wavelength for these wavelength routers be stable with temperature. The 3-cm differential path length corresponds to approximately 20,000 waves at the preferred center wavelength of 1550 nm. The preferred design has a change in the differential path length of less than one part in 20,000 over the preferred temperature range of at least 50° C. This requires that the differential path length change by less than one part in one million per degree Celsius. One way to achieve this temperature stability is to make the portion of the wavelength router containing the differential path length, wedge 107 shown in FIG. 10C, out of a glass that has thermal coefficient of less than one part in one million.

Figure 11A:
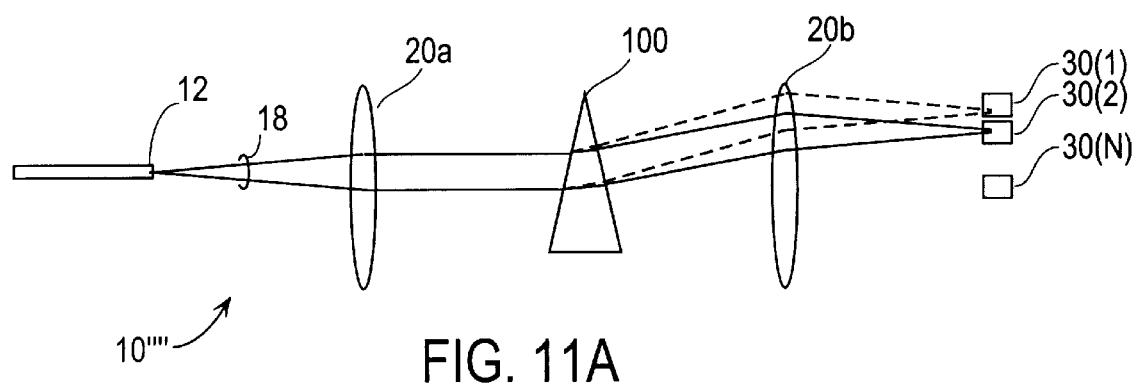
FIGS. 11A and 11B are schematic top and side views, respectively, of a wavelength router according to an embodiment of the invention that uses a prism as the dispersive element.
Figure 11B:
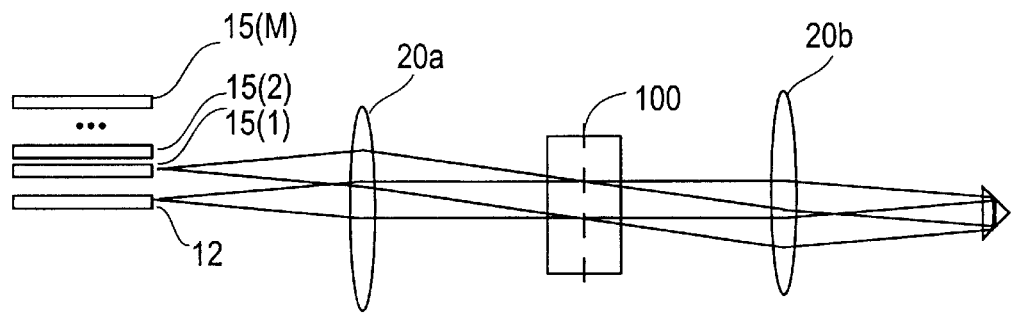

Attached hereto as an Appendix and filed as part of this application is a presentation, titled "Wavelength Router, also referred to as Wavelength Routing Element™ or WRE," containing 28 pages (slides) on 7 sheets. This presentation includes additional details and features of embodiments of the invention, and further shows how the invention can be incorporated into optical networks. The entire disclosure of the Appendix is incorporated by reference for all purposes. Conclusion While the above is a complete description of specific embodiments of the invention, various modifications, alternative constructions, and equivalents may be used. For example, FIGS. 11A and 11B show a wavelength router 10"" which uses a prism 110 instead of a grating as shown in the embodiments described above. The embodiment of FIGS. 11A and 11B correspond to the embodiment of FIGS. 2A and 2B, and corresponding reference numerals are used.

Additionally, while the dynamically configurable routing elements (retroreflectors and the like) were described as including movable elements, switching could also be effected by using electro-optic components. For example, an electro-optic Fabry-Perot reflector could be used.

Therefore, the above description should not be taken as limiting the scope of the invention as defined by the claims.

The following discussion describes a number of systems using multiple wavelength routers incorporated into optical networks. Each of the wavelength routers is shown as having a single input port and two output ports, and for definiteness as being able to handle 80 wavelength channels. In the nomenclature of the above description of the wavelength router, M=2 and N=80. The wavelength routers are designated with suffixed reference numerals 110. A hollow arrow at the top of each wavelength router represents a management interface.

The wavelength routers can be fabricated according to any of the above described embodiments of the invention, or could be fabricated in other ways so long as they provided the functionality of wavelength routing as described herein. In general, as noted above, the light paths within the wavelength routers of the above embodiments of the invention are reversible.

Optical Add-Drop Multiplexer (OADM)

Figure 12:
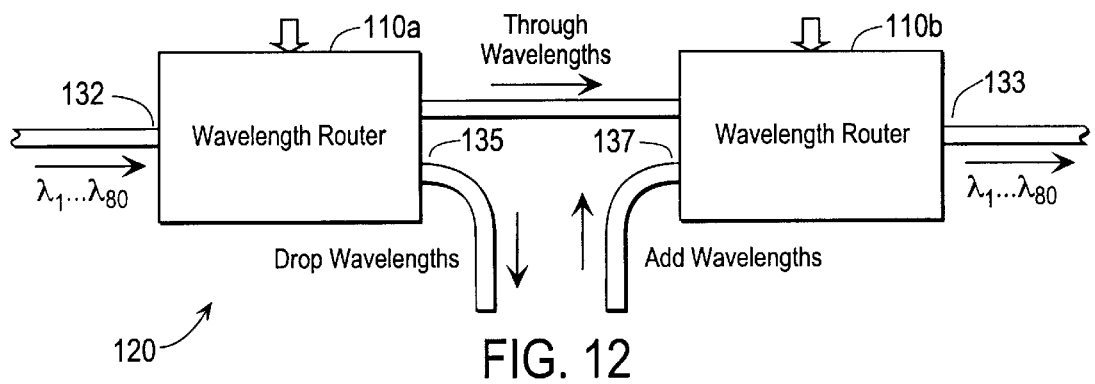
FIG. 12 is a schematic showing a combination of wavelength routers to provide le an optical add-drop multiplexer (OADM)

FIG. 12 is a schematic showing an optical add-drop multiplexer (OADM) 120 formed by combining a pair of wavelength routers 110a and 110b in a back-to-back configuration. The general functionality of the OADM is to receive a set of wavelength channels at an input port 132, pass a subset (including all or none) of the wavelengths (the through wavelengths) to an output port 133, divert (drop) those wavelengths not passed from the through path to a drop port 135, receive some or all of the dropped wavelengths (presumably carrying new information) at an add port 137, and combine the added wavelengths with the through wavelengths so that the through and the added wavelengths exit output port 133.

In the back-to-back configuration, input port 132 of OADM 120 is what would be considered the input port of wavelength router 110a while output port 133 of OADM 120 is what would be considered the input port of wavelength router 110b. The through path is effected by coupling the first output ports of the wavelength routers. Drop port 135 and add port 137 are what would be considered the second output ports of the wavelength routers.

Wavelength-Selective Cross-Connect (WSXC)

Figure 13:
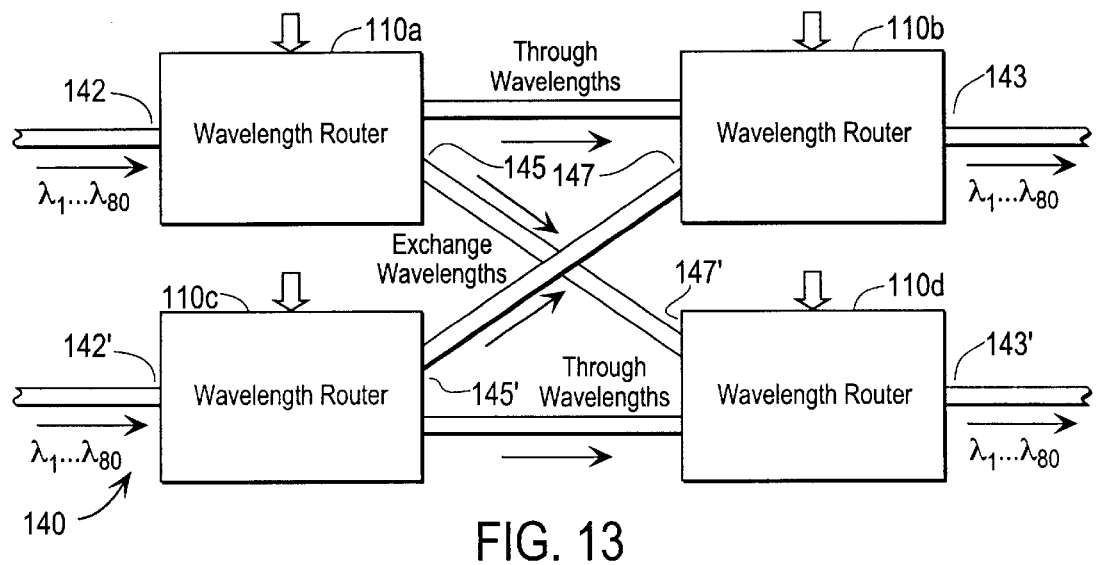
FIG. 13 is a schematic showing a combination of wavelength routers to provide a wavelength-selective cross-connect (WSXC)

FIG. 13 is a schematic showing a wavelength-selective cross-connect (WSXC) 140 formed by combining four wavelength routers 110a–110d in a paired back-to-back configuration. The general functionality of the WSXC is to receive first and second sets of wavelength channels at first and second input ports 142 and 142', and pass selected subsets of the wavelengths on respective through paths to first and second output ports 143 and 143', while exchanging those wavelengths not passed on the through paths. Thus the exchanged wavelengths from input port 142 emerge from exchange output ports 145 and 145' of wavelength routers 110a and 110c and are communicated to exchange input ports 147' and 147 of wavelength routers 110d and 110b, respectively. The exchanged wavelengths entering the exchange input ports are combined for output with the wavelengths on the through paths to emerge from output ports 143 and 143'. Again, as in the case of OADM described above, the output ports of WSXC 140 are what would be considered input ports of wavelength routers 110b and 110d.

Bi-Directional Line-Switched Ring (BLSR) Protection Switching

Figure 14:
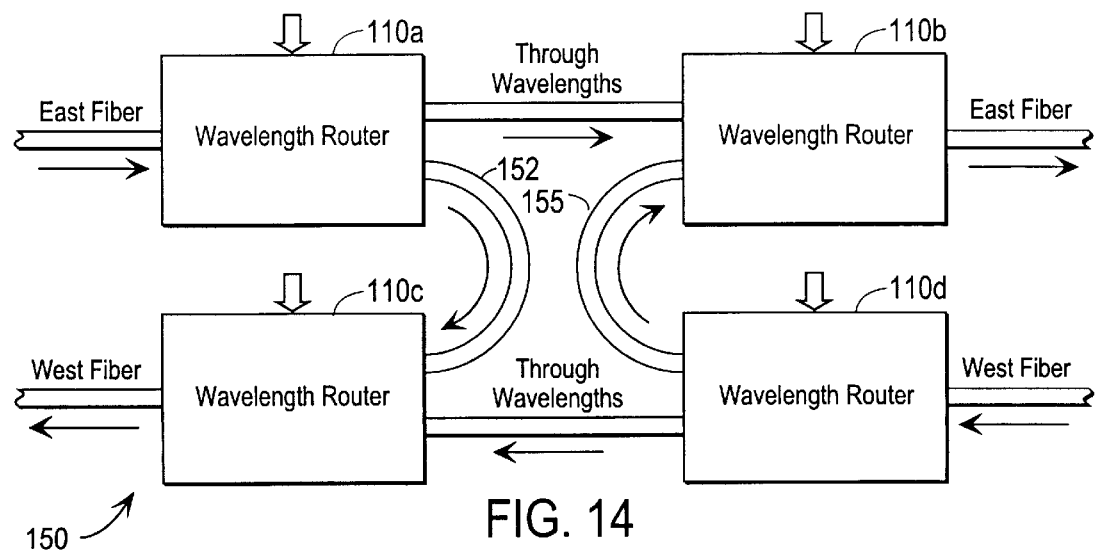
FIG. 14 is a schematic showing a combination of wavelength routers to provide protection switching in a bi-directional line-switched ring (BLSR) optical network.

FIG. 14 is a schematic showing a switching configuration 150 to provide protection switching in a bi-directional line-switched ring (BLSR) optical network. Configuration 150 is formed by combining four wavelength routers 110a–110d in a paired back-to-back configuration along the lines of WSXC 140 described above. This configuration differs from the WSXC in two main respects. First, in the WSXC, both the upper and lower pairs of wavelength routers operate with light traveling in the same direction, while in the switching configuration, the upper and lower pairs handle traffic in opposite directions, arbitrarily denoted "East" and "West." Second, instead of the exchange ports in the WSXC, the switching configuration provides loopback paths 152 and 155. Thus, it is possible to divert a subset of the wavelengths incoming to wavelength router 110a on the East fiber and direct them back onto the West fiber outgoing from wavelength router 110c. Similarly, those wavelengths (or perhaps a different set) that are incoming to wavelength router 110d on the West fiber are diverted and directed back onto the East fiber outgoing from wavelength router 110b.

What is claimed is:

1. A wavelength router for receiving light having a first number, N, of spectral bands at an input port and directing subsets of the N spectral bands to respective ones of a second number, M, of output ports, the wavelength router comprising:

a first cylindrical lens for collimating light emanating from the input port in a first transverse dimension;

a second cylindrical lens for collimating the light in a second transverse dimension that is orthogonal to the first transverse dimension;

a transmissive dispersive element for dispersing the light in the first transverse dimension in a particular sense;

a third cylindrical lens for focusing the light in the first transverse dimension;

a plurality of N tiltable mirrors in the focal plane of said third cylindrical lens, each intercepting a respective spectral band and directing that spectral band back toward said third cylindrical lens; and a plurality of actuators, each coupled to a respective tiltable mirror to effect selective tilting of the light path of the respective spectral band;

wherein each spectral band is collimated in the first transverse dimension by said third cylindrical lens, dispersed in the first transverse dimension by said dispersive element in a sense opposite the particular sense, focused in the second transverse dimension by said second cylindrical lens and focused in the first transverse dimension by said first cylindrical lens, whereupon each spectral band is brought to a focus in both the first and second transverse dimensions at a respective position determined by the respective tiltable mirror.

2. The wavelength router of claim 1, and further comprising an array of output fibers positioned at the output ports.

3. The wavelength router of claim 1 wherein said mirrors are made from micro-electro-mechanical system (MEMS) elements.

4. A wavelength router for receiving light having a first number, N, of spectral bands at an input port and directing subsets of the N spectral bands to respective ones of a second number, M, of output ports, the wavelength router comprising:

a first optical element with positive optical power disposed to collimate light emanating from the input port;

a transmissive dispersive element for dispersing the light in a first transverse dimension in a particular sense to spatially separate the spectral bands;

a second optical element with positive optical power disposed to focus the light traveling from said dispersive element; and a plurality of retroreflectors in the focal plane of said second optical element, each retroreflector intercepting a respective spectral band and directing that spectral band back toward said second optical element with a transverse displacement in a second transverse dimension that is orthogonal to the first transverse dimension, said transverse displacement depending on a state of that retroreflector;

wherein each spectral band is collimated by said second optical element, dispersed in the first transverse dimension by said dispersive element in a sense opposite the particular sense, and focused by said first optical element, whereupon each spectral band is brought to a focus at a respective position determined by the respective retroreflector.

5. A wavelength router for receiving light having a first number, N, of spectral bands at an input port and directing subsets of the N spectral bands to respective ones of a second number, M, of output ports, the wavelength router comprising:

an optical element with positive optical power disposed to collimate light emanating from the input port;

a reflective dispersive element for dispersing the light traveling from said optical element in a first transverse dimension in a particular sense to spatially separate the spectral bands, said dispersive element directing the spectral bands back to said optical element, which focuses the light traveling from said dispersive element; and a plurality of retroreflectors in the focal plane of said optical element, each retroreflector intercepting a respective spectral band and directing that spectral band back toward said optical element with a transverse displacement in a second transverse dimension that is orthogonal to the first transverse dimension, said transverse displacement depending on a state of that retroreflector;

wherein each spectral band is collimated by said optical element, dispersed in the first transverse dimension by said dispersive element in a sense opposite the particular sense, and focused by said optical element, whereupon each spectral band is brought to a focus at a respective position determined by the respective retroreflector.

6. The wavelength router of claim 5 wherein said optical element is a spherical lens.

7. The wavelength router of claim 5 wherein said optical element is a concave reflector.

8. The wavelength router of claim 5 wherein:

each retroreflector includes a rooftop prism; and the state of that retroreflector is defined by a transverse position of that retroreflector's rooftop prism.

9. The wavelength router of claim 5 wherein:

each retroreflector includes a rooftop prism and a relatively movable associated body of transparent material configured for optical contact with that retroreflector's rooftop prism; and the state of that retroreflector is defined at least in part by whether that retroreflector's rooftop prism is in optical contact with its associated body.

10. A wavelength router for receiving light having a first number, N, of spectral bands at an input port and directing subsets of the N spectral bands to respective ones of a second number, M, of output ports, the wavelength router comprising:

a first cylindrical lens for collimating light emanating from the input port in a first transverse dimension;

a second cylindrical lens for making the light traveling from said first cylindrical lens less divergent in a second transverse dimension that is orthogonal to the first transverse dimension;

a reflective dispersive element for dispersing the light traveling from said second cylindrical lens, said light being dispersed in the first transverse dimension in a particular sense, said dispersive element directing the spectral bands at different angles back to said second cylindrical lens;

the spectral bands traveling away from said dispersive element being collimated by said second cylindrical lens in the second transverse dimension and being focused by said first cylindrical lens in the first transverse dimension; and a plurality of N tiltable mirrors in the focal plane of said first cylindrical lens, each intercepting a respective spectral band and directing that spectral band back toward said first cylindrical lens;

wherein each spectral band leaving its respective tiltable mirror is collimated in the first transverse dimension by said first cylindrical lens, partially focused by said second cylindrical lens in the second transverse dimension, dispersed in the first transverse dimension by said dispersive element in a sense opposite the particular sense, further focused in the second transverse dimension by said second cylindrical lens and focused in the first transverse dimension by said first cylindrical lens, whereupon each spectral band is brought to a focus in both the first and second transverse dimensions at an output port determined by the respective tiltable mirror.

11. The wavelength router of claim 10 wherein said dispersive element has a resolution significantly less than a separation between spectral bands.

12. The wavelength router of claim 11 wherein the resolution is achieved by a differential path length greater than about 3 cm.

13. The wavelength router of claim 10 wherein:
each of said tiltable mirrors has a geometric dimension that defines a respective spectral acceptance range; and
said dispersive element has a resolution that is finer than the spectral acceptance range of said tiltable mirrors so as to provide each routed channel a spectral transfer function that is characterized by a band shape having a relatively flat top.

14. A wavelength router for receiving light having a first number, N, of spectral bands at an input port and directing subsets of the N spectral bands to respective ones of a second number, M, of output ports, the wavelength router comprising:
a first spherical lens having positive optical power;
a transmissive dispersive element for dispersing light in a first transverse dimension;
a second spherical lens having positive power; and
a plurality of retroreflectors, each retroreflector intercepting a respective spectral band and directing that spectral band back toward said second spherical lens with a transverse displacement in a second transverse dimension that is orthogonal to the first transverse dimension, said transverse displacement depending on a state of that retroreflector;
wherein:
said first spherical lens, said dispersive element, said second spherical lens, and said plurality of N retroreflectors are disposed so that light emanating from the input port encounters, in order, said first spherical lens a first time, said dispersive element a first time, said second spherical lens a first time, said plurality of N retroreflectors, said second spherical lens a second time, said dispersive element a second time, and said first spherical lens a second time;
said first spherical lens operates said first time to collimate the light, and said second time to focus the light on the output ports;
said second spherical lens operates said first time to focus the light on said plurality of retroreflectors, and said second time to collimate the light; and
said dispersive element operates said first time to impart an angular separation among the spectral bands in the first transverse dimension so that the spectral bands encounter their respective retroreflectors, and operates said second time to remove said angular separation among the spectral bands in the first transverse dimension;
whereupon each spectral band is brought to a focus at an output port determined by the state of the respective retroreflector.

15. The wavelength router of claim 14 wherein wherein said dispersive element has a resolution significantly less than a separation between spectral bands.

16. The wavelength router of claim 15 wherein the resolution is achieved by a differential path length greater than about 3 cm.

17. The wavelength router of claim 14 wherein:
each of said retroreflectors has a geometric dimension that defines a respective spectral acceptance range; and
said dispersive element has a resolution that is finer than the spectral acceptance range of said retroreflectors so as to provide each routed channel a spectral transfer function that is characterized by a band shape having a relatively flat top.

18. A wavelength router for receiving light having a first number, N, of spectral bands at an input port and directing subsets of said N spectral bands to respective ones of a second number, M, of output ports, the wavelength router comprising:
a spherical lens having positive optical power;
a reflective dispersive element for dispersing light in a first transverse dimension; and
a plurality of retroreflectors, each retroreflector intercepting a respective spectral band and directing that spectral band back toward said spherical lens with a transverse displacement in a second transverse dimension that is orthogonal to the first transverse dimension, said transverse displacement depending on a state of that retroreflector;
wherein:
said spherical lens, said dispersive element, and said plurality of N retroreflectors are disposed so that light emanating from the input port encounters, in order, said spherical lens a first time, said dispersive element a first time, said spherical lens a second time, said plurality of N retroreflectors, said spherical lens a third time, said dispersive element a second time, and said spherical lens a fourth time;
said spherical lens operates said first time to collimate the light, said second time to focus the light onto said plurality of N retroreflectors, said third time to collimate the light, and said fourth time to focus the light on the output ports; and
said dispersive element operates said first time to impart an angular separation among the spectral bands in the first transverse dimension so that the spectral bands encounter their respective retroreflectors, and operates said second time to remove said angular separation among the spectral bands in the first transverse dimension;
whereupon each spectral band is brought to a focus at an output port determined by the state of the respective retroreflector.

19. The wavelength router of claim 18 wherein said dispersive element has a resolution significantly less than a separation between spectral bands.

20. The wavelength router of claim 19 wherein the resolution is achieved by a differential path length greater than about 3 cm.

21. The wavelength router of claim 18 wherein:
each of said retroreflectors mirrors has a geometric dimension that defines a respective spectral acceptance range; and
said dispersive element has a resolution that is finer than the spectral acceptance range of said retroreflectors so as to provide each routed channel a spectral transfer function that is characterized by a band shape having a relatively flat top.

22. A wavelength router for receiving light having a first number, N, of spectral bands at an input port and directing subsets of the N spectral bands to respective ones of a second number, M, of output ports, the wavelength router comprising:
a first cylindrical lens having positive optical power in a first transverse dimension;
a second cylindrical lens having positive optical power in a second transverse dimension that is orthogonal to the first transverse dimension;
a transmissive dispersive element for dispersing light in the first transverse dimension;
a third cylindrical lens having positive optical power in the first transverse dimension; and a plurality of N tiltable mirrors, each tiltable mirror intercepting a respective spectral band and directing that spectral band back toward said second cylindrical lens with an angular displacement depending on a state of that tiltable mirror;

wherein:

said first cylindrical lens, said second cylindrical lens, said transmissive dispersive element, and said plurality of N tiltable mirrors are disposed so that light emanating from the input port encounters said first cylindrical lens a first time, said second cylindrical lens a first time, said dispersive element a first time, said third cylindrical lens a first time, said plurality of N tiltable mirrors, said third cylindrical lens a second time, said dispersive element a second time, said second cylindrical lens a second time, and said first cylindrical lens a second time;

said first cylindrical lens operates said first time to collimate the light in the first transverse dimension, and said second time to focus the light in the first transverse dimension on the output ports;

said second cylindrical lens operates said first time to collimate the light in the second transverse dimension, and said second time to focus the light in the second transverse dimension; and said third cylindrical lens operates said first time to focus the light in the first transverse dimension onto said plurality of N tiltable mirrors, and said second time to collimate the light in the first transverse dimension;

said dispersive element operates said first time to impart an angular separation among the spectral bands in the first transverse dimension so that the spectral bands encounter their respective tiltable mirrors, and operates said second time to remove said angular separation among the spectral bands in the first transverse dimension;

whereupon each spectral band is brought to a focus in both the first and second transverse dimensions at an output port determined by the state of the respective tiltable mirror.

23. The wavelength router of claim 22 wherein said dispersive element has a resolution significantly less than a separation between spectral bands.

24. The wavelength router of claim 23 wherein the resolution is achieved by a differential path length greater than about 3 cm.

25. The wavelength router of claim 22 wherein:

each of said tiltable mirrors has a geometric dimension that defines a respective spectral acceptance range; and said dispersive element has a resolution that is finer than the spectral acceptance range of said tiltable mirrors so as to provide each routed channel a spectral transfer function that is characterized by a band shape having a relatively flat top.

26. A wavelength router for receiving light having a first number, N, of spectral bands at an input port and directing subsets of the N spectral bands to respective ones of a second number, M, of output ports, the wavelength router comprising:

a first cylindrical lens having positive optical power in a first transverse dimension;

a second cylindrical lens having positive optical power in a second transverse dimension that is orthogonal to the first transverse dimension;

a reflective dispersive element for dispersing light in the first transverse dimension; and a plurality of N tiltable mirrors, each intercepting a respective spectral band and directing that spectral band back toward said first cylindrical lens with an angular displacement depending on a state of that tiltable mirror;

wherein:

said first cylindrical lens, said second cylindrical lens, said dispersive element, and said plurality of N tiltable mirrors are disposed so that light emanating from the input port encounters, in order, said first cylindrical lens a first time, said second cylindrical lens a first time, said dispersive element a first time, said second cylindrical lens a second time, said first cylindrical lens a second time, said plurality of N tiltable mirrors, said first cylindrical lens a third time, said second cylindrical lens a third time, said dispersive element a second time, said second cylindrical lens a fourth time, and said first cylindrical lens a fourth time;

said first cylindrical lens operates said first time to collimate the light in the first transverse dimension, said second time to focus the light in the first transverse dimension onto said plurality of N tiltable mirrors, said third time to collimate the light in the first transverse dimension, and said fourth time to focus the light in the first transverse dimension on the output ports;

said second cylindrical lens operates to collimate the light in the second transverse dimension upon passage of the light through said second cylindrical lens said first and second times, and to focus the light in the second transverse dimension upon passage of the light through said second cylindrical lens said third and fourth times; and said dispersive element operates said first time to impart an angular separation among the spectral bands in the first transverse dimension so that the spectral bands encounter their respective tiltable mirrors, and operates said second time to remove said angular separation among the spectral bands in the first transverse dimension;

whereupon each spectral band is brought to a focus in both the first and second transverse dimensions at an output port determined by the state of the respective tiltable mirror.

27. The wavelength router of claim 26 wherein said dispersive element has a resolution significantly less than a separation between spectral bands.

28. The wavelength router of claim 27 wherein the resolution is achieved by a differential path length greater than about 3 cm.

29. The wavelength router of claim 26 wherein:

each of said tiltable mirrors has a geometric dimension that defines a respective spectral acceptance range; and said dispersive element has a resolution that is finer than the spectral acceptance range of said tiltable mirrors so as to provide each routed channel a spectral transfer function that is characterized by a band shape having a relatively flat top.

* * * * *

UNITED STATES PATENT AND TRADEMARK OFFICE
CERTIFICATE OF CORRECTION

PATENT NO. : 6,501,877 B1
DATED : December 31, 2002
INVENTOR(S) : Robert T. Weverka, Steven P. Georgis and Richard S. Roth It is certified that error appears in the above-identified patent and that said Letters Patent is hereby corrected as shown below:

<u>Title page,</u>
Item [75], Inventors, after "Robert T. Weverka, San Mateo, CA (US);" delete "Steven P. Georgis, Boulder, CO (US);"

Signed and Sealed this

Fourth Day of November, 2003

JAMES E. ROGAN
*Director of the United States Patent and Trademark Office*